F. E. MEIGS.
BELT PULLEY.
APPLICATION FILED JUNE 6, 1911.
1,042,583.
Patented Oct. 29, 1912.
2 SHEETS—SHEET 1.
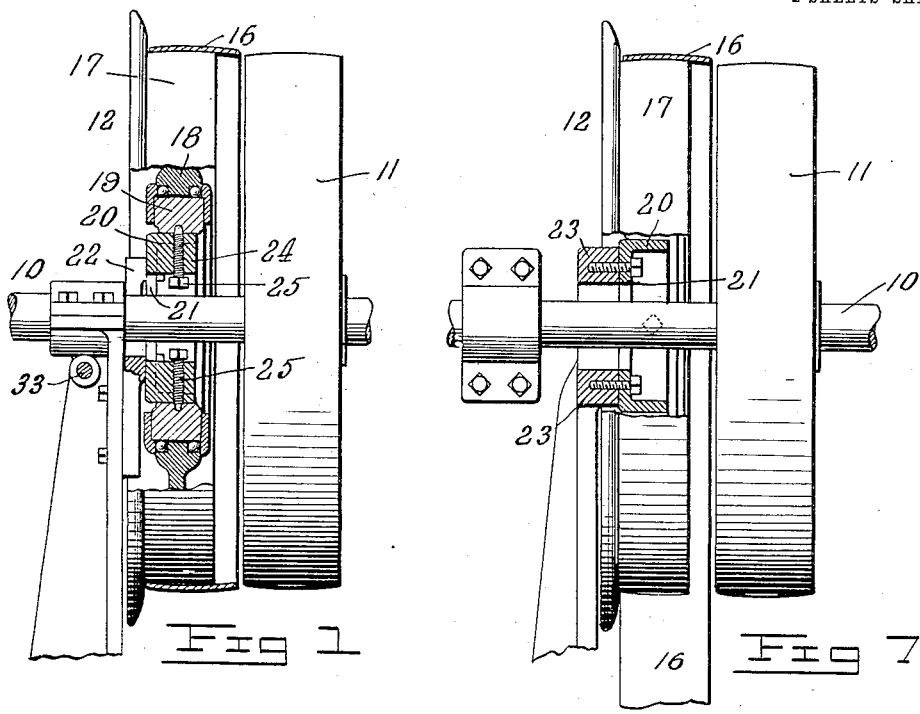
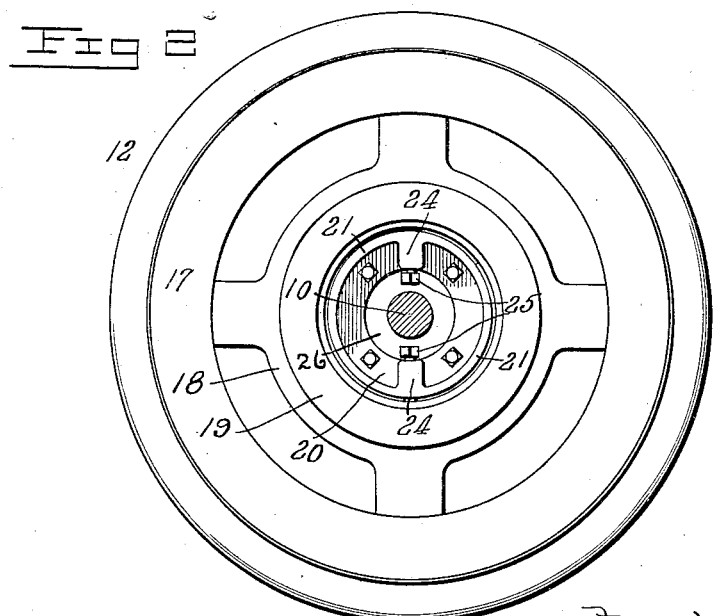

F. E. MEIGS.
BELT PULLEY.
APPLICATION FILED JUNE 6, 1911.
1,042,583.
Patented Oct. 29, 1912.
2 SHEETS—SHEET 2.
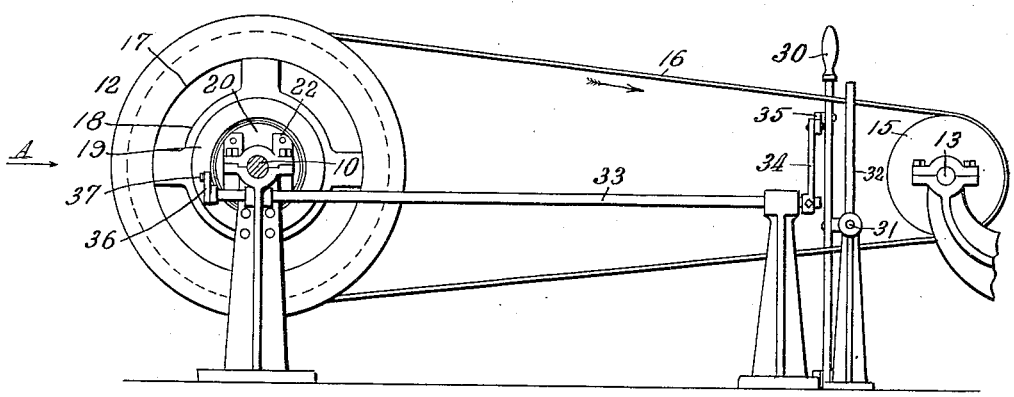
Fig 3
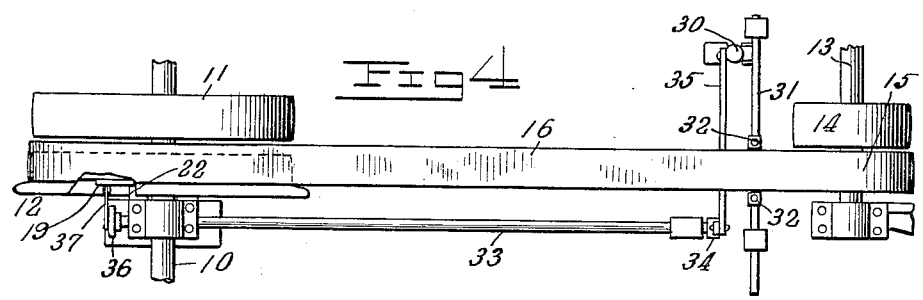
Fig 4
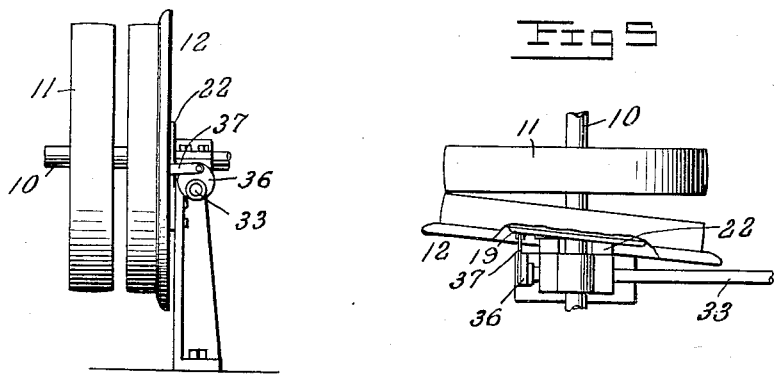
Fig 5
Fig 6
Witnesses
Inventor
By
Attorney
COLUMBIA PLANOGRAPH CO., WASHINGTON, D. C.

UNITED STATES PATENT OFFICE.

FRANK E. MEIGS, OF BURLINGTON, VERMONT.

BELT-PULLEY.

1,042,583.  Specification of Letters Patent.  Patented Oct. 29, 1912.

Application filed June 6, 1911. Serial No. 631,572.

*To all whom it may concern:*

Be it known that I, FRANK E. MEIGS, a citizen of the United States, and resident of Burlington, in the county of Chittenden and State of Vermont, have invented certain new and useful Improvements in Belt-Pulleys, of which the following is a specification.

This invention relates to belt pulleys for shafting, particularly to idle pulleys onto which drive belts are shifted and carried when it is desired to stop the operation of machinery driven by them.

The object of the invention is to provide an idle pulley or belt carrier rotatably mounted adjacent a fixed pulley, but not on the shaft of said pulley, which can be moved out of line or rocked on an axis perpendicular to a line connecting the axes of the driving and driven pulleys, and also to the axis of the driving shaft, for the purpose of automatically shifting the drive belt from the idle pulley or carrier onto the fixed pulley and from the fixed pulley onto the idle pulley. The construction is such that the belt and idle pulley will both remain at rest during the time the belt is on said pulley, and as the pulley is not mounted to turn on the said shaft there is no friction or wear between said parts.

In the particular form of the device herein shown and described when the belt is on the idle pulley or carrier it may be automatically shifted to the fixed pulley by rocking or moving said idle pulley out of line, whereupon the belt which is wider than said idle pulley engages by its overlapping edge, the said rotating fixed pulley and immediately draws the belt thereon in a manner well known. The belt may be moved from the fixed pulley onto the idle pulley by swinging the latter in the opposite direction, or, as represented in the drawing, by means of an ordinary belt shifting mechanism shown placed in juxtaposition to the driven pulley and shaft.

With these and other objects in view the invention consists of a novel construction, combination and arrangement of parts hereinafter described in detail, and pointed out in the appended claims, reference being had to the accompanying drawings, in which, Figure 1 is an edge view of a fixed and idle pulley, a portion of the latter being broken away to show the internal construction, Fig. 2 is an elevation of the same viewed from the right hand side of Fig. 1, Fig. 3 is an elevation of the improved idle pulley from the opposite side shown in connection with the driven mechanism, and means for shifting the belt and rocking the idle pulley or throwing it out of line. Fig. 4 is a top plan view of the same, Fig. 5 is a plan view showing the idle pulley moved out of line or rocked for the purpose of shifting the belt therefrom onto the fixed pulley. Fig. 6 is an elevation looking in the direction of the arrow A, Fig. 3. Fig. 7 illustrates a modification.

Similar reference characters are used to designate the same parts in all the figures.

In the drawings, the numeral 10 designates a driving shaft journaled in suitable bearings and carrying a fixed pulley 11, adjacent which pulley and normally concentric therewith is an idle pulley 12 of the same diameter, rotatable around the shaft 10, but wholly disconnected therefrom. A driven shaft 13 mounted in suitable bearings carries a fixed pulley 14 and a loose pulley 15 of the usual type and is rotated by a belt 16, connecting the fixed pulleys 11 and 14.

The idle pulley 12 forming the subject matter of this application, comprises a rim 17, preferably flanged on its outer edge and a hub 18 of large diameter connected to the rim by a web, spokes, or any other well known means. Within the hub 18 is a non-rotatable annular bearing 19 around which the pulley may revolve on anti-friction devices of any approved type between the said hub and bearing. A ring 20 situated within the bearing 19 and spaced therefrom a suitable distance is formed with an inwardly projecting flange 21, in the plane of rotation of said wheel by means of which flange the ring is rigidly bolted to a fixed support, such as a plate 22 attached to one of the shaft bearings, illustrated in Figs. 1 and 3, or to an independent support 23, as in Fig. 7. Screwed radially into the ring 20 or into lugs 24, projecting inwardly from said ring on diametrically opposite sides, are two bolts 25, their exteriorly projecting ends being seated in holes or depressions in the inner face of the annular bearing 19 to form pivots on which the said bearing and idle pulley 12 may be thrown out of line or rocked laterally to and from the adjacent fixed pulley 11 on either side of the axis of said bolts or pivots. The axial opening 26 in the ring 20 is sufficiently large to permit the shaft 10 to extend therethrough without touching the heads of the pivot bolts 25, which project into said opening.

If desired some suitable means may be employed for shifting the belt from the fixed pulley onto the idle pulley or carrier and simultaneously rocking or tilting the annular bearing 19 to bring the rim of the idle pulley or belt carrier 12 into contact with the fixed pulley for automatically transferring the belt thereon, as for instance, that shown in Figs. 3 and 4. As shown in said figures, 30 designates a lever for operating a rod 31 carrying fingers 32 between which the belt runs and by which the belt may be changed from one pulley on the driven shaft to the other in well known manner. Supported in suitable bearings is a rock shaft 33 provided with an arm 34 on one end by means of which it may be rocked by hand, either independently, or simultaneously with the shifting lever by pivoting a connecting rod 35 to said lever and arm. On the opposite end of the rock shaft 33 is fixed a disk, crank, or equivalent means 36 connected by a link 37 to the annular bearing 19 in such manner that on turning said rock shaft the bearing will swing on its pivots 25 and throw the idle pulley 12 out of line and into contact at one side with the fixed pulley 11, as in Fig. 5. The belt 16 is wider than the idle pulley 12 and projects over its side adjacent the fixed pulley, so that when said pulley is tilted, the edge of the belt will engage the rotating fixed pulley and be drawn thereon in a manner well understood. After the belt has left the idle pulley 12 it may be returned to normal position by a reverse movement of arm 34 if it be not connected to the shifting lever 30, but should it be so connected, the idle pulley will be straightened when the shifting lever is operated to throw the belt off the fixed pulley. The idle pulley 12 not being mounted on the driving shaft, nor connected with it in any way will rotate for a short period only when the belt is being shifted onto and off the same, thus saving the belt and pulleys from the wear of continuous running and also lessening the danger of accidents always present where there are running belts.

Among other advantages gained by the use of this idle pulley or belt holder may be mentioned a large saving in oil and time taken for oiling and repairs, no danger of fire caused by overheated loose pulleys, a saving in power because belt and pulleys do not run when the driven machine is not in use; the strain on the driving shaft is also lessened, belts may be run tighter, consequently giving more power as there is no danger of grinding out or heating loose pulleys. This device may also be used in place of a clutch when it is desired to connect a parallel line of shafting that is used only occasionally.

It is to be understood that the particular means shown and described for swinging the annular bearing are only illustrative, as other means, equally efficient, may be employed for this purpose. Furthermore the supporting plate 22 shown in Figs. 1 and 3, and the independent support 23 of Fig. 7 do not afford a bearing for the shaft 10. The plate 22 is forked, as shown in Fig. 3, to surround the shaft 10, and is open at its top to enable the removal of said shaft from its bearings when so desired. The independent support 23 may also be open at one side so that the shaft may be removed from within the same without drawing it endwise.

Having thus fully described my invention I claim:—

1. In combination with a pulley, a rocking bearing around which said pulley rotates and with which it rocks, and fixed pivotal supports for said bearing within the perimeter of the pulley in line with each other and perpendicular to the axial line of the pulley.

2. In combination with a pulley, a bearing supporting said pulley and around which it is adapted to rotate, and a fixed member within said bearing on which the latter and the pulley are adapted to rock about an axis perpendicular to the axis of the pulley.

3. In combination with a pulley, a rocking bearing on which said pulley is mounted to rotate, fixed pivots on which said bearing rocks disposed in line with each other perpendicular to the axis of the pulley, and within the perimeter of said rocking bearing.

4. In combination with a pulley, a rocking bearing around which said pulley is adapted to rotate, a fixed member within said rocking bearing, and pivots projecting from opposite sides of said member on which the bearing may rock, said pivots being within the perimeter of the bearing and perpendicular to its axis 5. The combination with a fixed pulley, of an idle pulley adjacent said fixed pulley, a rocking bearing on which said idle pulley is adapted to rotate wholly within the perimeter of the idle pulley, a fixed member within the rocking bearing, and oppositely disposed pivots on the fixed member on which the rocking bearing is supported, the axes of said pivots being perpendicular to and intersecting the axis of the fixed pulley.

6. An idle pulley, a rocking bearing on which said pulley is rotatably mounted, and relatively fixed pivots within the perimeter of said pulley supporting said bearing.

7. An idle pulley, a rocking bearing on which said pulley is rotatably mounted, relatively fixed pivots within the perimeter of said pulley supporting said bearing, and means for rocking said bearing to throw said pulley out of line.

8. An idle pulley, an annular rocking bearing on which said pulley is rotatably mounted, a fixed member within said annular bearing, and pivots mounted in said fixed member for supporting said annular bearing.

9. In a device of the character described, a fixed annular member, relatively fixed pivots mounted in said fixed member, a non-rotatable bearing surrounding said fixed member and mounted to rock upon said pivots, and an idle pulley rotatably supported on said bearing.

10. In a device of the character described, a fixed annular member, adjustable and removable pivots mounted in said fixed member, an annular rocking bearing surrounding said fixed member and supported on said pivots, and an idle pulley rotatably supported on said bearing.

11. An idle pulley, a non-rotatable annular bearing on which said pulley is rotatably mounted, relatively fixed pivots within the perimeter of said pulley supporting said bearing whereby said bearing and pulley are adapted to rock on an axis contained within the perimeter of said pulley, and means for rocking said bearing to throw said pulley out of line.

12. In combination with a shaft, and a fixed pulley on said shaft, an idle pulley coaxial with said fixed pulley, an annular rocking bearing on which said idle pulley is rotatably mounted, and relatively fixed pivots within the perimeter of said idle pulley supporting said bearing.

13. In combination with a shaft, and a fixed pulley on said shaft, an idle pulley coaxial with said fixed pulley, an annular rocking bearing on which said idle pulley is rotatably mounted, a fixed member within said annular bearing, and pivots mounted in said fixed member for supporting said bearing.

Signed at Burlington, in the county of Chittenden, and State of Vermont this 26th day of May, A. D. 1911.

FRANK E. MEIGS.

Witnesses:
H. T. RUTTER,
A. E. JURY.

---

Copies of this patent may be obtained for five cents each, by addressing the "Commissioner of Patents, Washington, D. C."